United States Patent [19]

Logan et al.

[11] 4,284,580

[45] Aug. 18, 1981

[54] FRACTIONATION OF TRIGLYCERIDE MIXTURE

[75] Inventors: Ted J. Logan; Richard M. King, both of Cincinnati, Ohio

[73] Assignee: The Procter & Gamble Company, Cincinnati, Ohio

[21] Appl. No.: 108,999

[22] Filed: Jan. 2, 1980

[51] Int. Cl.$^3$ ............................ C09F 5/10; C11B 3/00

[52] U.S. Cl. ................................ 260/428.5; 260/428; 560/218

[58] Field of Search ...................... 260/428.5; 560/218

[56] References Cited

U.S. PATENT DOCUMENTS

| | | | |
|---|---|---|---|
| 852,441 | 5/1907 | Lockwood | 260/428.5 |
| 2,197,861 | 4/1940 | Hyman | 260/428.5 |
| 2,288,441 | 6/1942 | Ewring | 260/428.5 |
| 2,314,621 | 3/1943 | Kelley | 260/425 |
| 2,509,509 | 5/1950 | Leaders | 260/428.5 |
| 2,577,079 | 12/1951 | Gee | 260/428.5 |
| 2,985,589 | 5/1961 | Broughton | 210/31 |
| 4,048,205 | 9/1977 | Neuzil | 260/428.5 X |
| 4,049,688 | 9/1977 | Neuzil | 260/428.5 X |
| 4,189,442 | 2/1980 | Lubsen et al. | 260/428.5 |
| 4,213,913 | 7/1980 | de Rosset | 260/428.5 |

FOREIGN PATENT DOCUMENTS

| | | | |
|---|---|---|---|
| 1476511 | 6/1977 | United Kingdom | 260/428.5 |

OTHER PUBLICATIONS

Dallar et al. Leben. Wiss. Tech., vol. 10, No. 6, pp. 328–331, (1977).

Jurriens et al., JAOCS, vol. 42, pp. 9–14, Jan. 1965.

Derwent Abst. of Jap. Pat. Appln. 54/084519, 7/7/79.

Lam et al., J. Chem. Sci. 15, pp. 234–238, Jul. 1977.

Breck D. Zeolite, Molecular Sieves, New York (1974).

Chem and Ind. 24, pp. 150–151 and 1049–1050 (1962).

JAOCS 41, 403–406, Jun. 1964.

*Primary Examiner*—John F. Niebling

*Attorney, Agent, or Firm*—Ronald L. Hemingway; Richard C. Witte

[57] ABSTRACT

Triglyceride mixture is fractionated (on the basis of Iodine Value) utilizing selected surface aluminated silica gel adsorbent and selected solvent(s).

17 Claims, No Drawings

FRACTIONATION OF TRIGLYCERIDE MIXTURE

TECHNICAL FIELD

The field of the invention is the separation of triglyceride mixture to obtain product(s) of Iodine Value different from that of said mixture.

The invention is useful, for example, to remove a particular undesirable lower Iodine Value fraction. A very important application of this is the treatment of oils with mostly unsaturated fatty acid moieties (e.g. sunflower oil) to reduce the content of triglyceride with fatty acid moiety having saturated carbon chain. This allows productions of a salad or cooking oil with essentially zero percent saturates (by FDA nutritional standards).

The invention is also useful, for example, to remove an undesirable higher Iodine Value fraction from a feedstock. An important application of this is the processing of soybean oil to reduce the content of triglyceride with linolenic acid moiety to minimize the development of rancidity and odor and thereby obtain the benefits of touch hardening without the disadvantages of cis to trans isomerization, double bond position changes and need to remove catalyst and hydrogenation odor.

Other important applications of the invention are the recovery of increased trilinolein level composition from regular safflower oil and the recovery of increased triolein level composition from high oleic safflower oil.

The invention is also useful for obtaining particular Iodine Value cuts for any special purpose.

BACKGROUND ART

Logan et al U.S. patent application Ser. No. 043,394, filed May 25, 1979, now abandoned in favor of U.S. Ser. No. 134,029, filed Mar. 26, 1980, discloses the fractionation of triglyceride mixtures utilizing macroreticular strong acid cation exchange resin adsorbents. The invention herein differs, for example, in utilizing an adsorbent which is advantageous over that used in Ser. No. 043,394 from the standpoints of flexibility, dynamic capacity, cost, and of being inorganic rather than organic in nature.

It is known to remove various non-triglyceride impurities from triglyceride mixtures utilizing various aluminosilicate adsorbents. See, for example: U.S. Pat. No. 852,441; U.S. Pat. No. 2,288,441; U.S. Pat. No. 2,314,621; U.S. Pat. No. 2,509,509; U.S. Pat. No. 2,577,079. This kind of art discloses using aluminosilicates to decolorize, deodorize, treat used oil, refine, remove trace metals, remove catalyst and remove free fatty acid. The process herein differs, for example, in the feedstock which is essentially free of the type of impurities to which this body of prior art is addressed to removing.

It is known on an analytical scale to separate triglyceride mixtures utilizing silica gel treated with silver nitrate. See, for example, *Journal of the American Oil Chemists Society,* 41, pp. 403–406 (June 1964). The adsorbent there has the disadvantage of having a short life cycle in that the silver nitrate being not chemically attached is leached out. The adsorbent used herein has no such short life cycle problem.

U.S. Pat. No. 2,197,861 suggests the possibility of utilizing an aluminosilicate to cause polymerization in an animal, vegetable or marine oil whereby unpolymerized material is readily separated from polymerized material. Such a process would have the disadvantage of producing unuseful polymerized material. The process of the instant invention is carried out without significant polymerization occurring.

Neuzil et al U.S. Pat. No. 4,048,205 and Neuzil et al U.S. Pat. No. 4,049,688 and Logan et al U.S. Pat. No. 4,210,594 disclose the fractionation of alkyl fatty carboxylate mixtures using synthetic crystalline aluminosilicates (zeolites). These crystalline aluminosilicate adsorbents typically contain up to about 25% amorphous aluminosilicate, e.g., clay. The process of the invention herein differs, for example, in the feedstock. The process of the invention herein also differs in the adsorbent which is advantageous over the crystalline zeolite adsorbents from the standpoints of versatility (in that, with the adsorbent herein, the same equipment and packing is advantageously used for separation of alkyl carboxylates and triglycerides—this is not true for crystalline zeolites), flexibility (in that various ratios of surface-silicon atoms to aluminum atoms and various surface areas are readily available for the adsorbent herein—there is substantially less choice for crystalline zeolites), and dynamic capacity (in respect to selectively adsorbing triglyceride of higher Iodine Value). Lam et al, "Silver Loaded Aluminosilicate As a Stationary Phase for the Liquid Chromatographic Separation of Unsaturated Compounds", *J. Chromatog. Sci.* 15 (7), 234–8 (1977) discloses the analytical (chromatographic) separation of bromophenacyl carboxylates on the basis of unsaturation utilizing silvered, surface aluminated silica gel adsorbents of microparticulate particle size (which particle size is not readily handled in a non-analytical commercial context and can result in significant loss due to suspension of particles in solvent). The process of the instant invention differs at least in the feedstock and the adsorbent particle size.

BROAD DESCRIPTION OF THE INVENTION

It is an object of this invention to provide a process for fractionating triglyceride mixtures on the basis of Iodine Value utilizing an adsorbent which is made from low cost and readily available materials, which is readily provided with selected characteristics (ready choice in ratio of surface-silicon atoms to aluminum atoms, silica gel pore size and surface area, and cation substituents and level thereof), which is not subject to a cation leaching problem (as is silver nitrate treated silica gel), which has a particle size appropriate for commercial processing (no significant handling or loss problems as with microparticulate particle sizes), which is advantageous over crystalline zeolite adsorbents from the standpoints of flexibility and dynamic capacity and which is advantageous over resin adsorbents from the standpoints of flexibility, dynamic capacity, cost, and of being inorganic in nature.

This object and other objects and advantages are readily obtained by the invention herein as described below.

The invention herein involves fractionating triglyceride mixture, on the basis of Iodine Value, utilizing selected solvent(s) and selected surface aluminated silica gel adsorbent.

The feed (sometimes called feedstock) is a mixture of triglycerides with different Iodine Values (a mixture of triglyceride and higher Iodine Value with triglyceride of lower Iodine Value) which is to be separated to produce fractions of higher Iodine Value and lower Iodine Value. The triglycerides in the feed have carboxylic acid moieties which contain carbon chains containing from 6 to 26 carbon atoms. It is important that the feed is essentially free of impurities which can foul the adsorbent thereby causing loss of fractionating performance.

The feed is dissolved in particular solvent (the adsorption vehicle). The solution which is formed is contacted with particular surface aluminated silica gel adsorbent. Triglyceride of higher Iodine Value is selectively adsorbed on such adsorbent, and a fraction of the mixture which is enriched (compared to the feed) in content of triglyceride of lower Iodine Value is left in solution.

Solution of the fraction which is enriched in content of triglyceride of lower Iodine Value is removed from contact with the adsorbent which has selectively adsorbed triglyceride of higher Iodine Value; this solution is denoted a raffinate. Fraction enriched in content of triglyceride of lower Iodine Value can readily be recovered from the raffinate as described later.

The adsorbent which has selectively adsorbed thereon triglyceride of higher Iodine Value is contacted with particular solvent (the desorbent) to cause desorption of adsorbed triglyceride and provide a solution in the solvent of fraction enriched (compared to the feed) in content of triglyceride of higher Iodine Value.

Solution in solvent of fraction enriched in content of triglyceride of higher Iodine Value is removed from contact with the adsorbent which has undergone desorption of triglyceride; this solution is denoted in extract. Fraction enriched in content of triglyceride of higher Iodine Value can be readily recovered from the extract as described later.

Preferred is a process where the solvent which is used to dissolve feed for selective adsorption (that is, the adsorption vehicle), and the solvent which is used as the vehicle for desorption (that is, the desorbent) have the same composition. Such process is conveniently referred to herein as a one solvent process. Preferably, such one solvent process is carried out continuously utilizing a simulated moving bed unit operation.

Less preferred is a process where the solvent which is used as the dissolving phase during adsorption and the solvent which is used as the vehicle for desorption have different compositions. This process is conveniently referred to herein as a two solvent process.

In general, the solvent(s) utilized herein (whether in a one solvent process or in a two solvent process) is (are) characterized by a solubility parameter (on a 25° C. basis) ranging from about 7.0 to about 15.0, a solubility parameter dispersion component (on a 25° C. basis) ranging from about 7.0 to about 9.0, a solubility parameter polar component (on a 25° C. basis) ranging from 0 to about 6.0 and a solubility parameter hydrogen bonding component (on a 25° C. basis) ranging from 0 to about 11.5.

The surface aluminated silica gel adsorbent for the process herein is a synthetic amorphous aluminosilicate cation exchange material. It is homogeneous with respect to silicon atoms but not with respect to aluminum atoms; aluminum atoms are present essentially entirely at the surface of the adsorbent (i.e., they are associated with surface-silicon atoms) and are considered to be essentially completely in the form of aluminate moieties.

The adsorbent is derived from silica gel having a mean pore diameter of at least about 50 angstroms and a surface area of at least about 100 square meters per gram. The adsorbent is further characterized by a ratio of surface-silicon atoms to aluminum atoms ranging from about 3:1 to about 20:1, a moisture content less than about 10% by weight, and a particle size ranging from about 200 mesh to about 20 mesh.

The adsorbent has cation substituents selected from the group consisting of cation substituents capable of forming $\pi$ complexes and cation substituents not capable of forming $\pi$ complexes and combinations of these.

The adsorbent is formed by first treating particular silica gel with aluminate ion; then, if necessary, adjusting the cation content (e.g. by providing a selected level of cation substituents capable of forming $\pi$ complexes); and adjusting the moisture content. Particle size can also be adjusted.

The solvent(s) (that is, the adsorption vehicle and the desorbent, whether in a one solvent process or a two solvent process), the ratio of surface-silicon atoms to aluminum atoms in the adsorbent, and the level of cation substituents capable of forming $\pi$ complexes (which level can range from none at all up to 100% of exchange capacity) are selected to provide selectivity during adsorption and satisfactory desorption of adsorbed triglyceride.

Processing is carried out without significant polymerization of triglyceride occurring.

The invention herein contemplates one stage processing as well as processing in a plurality of stages. One stage processing is suitable for separating a mixture into two fractions. Multistage processing is suitable for separating a mixture into more than two fractions.

As used herein, the term "selectively" in the phrase "selectively adsorb" describes the ability of the adsorbent to preferentially adsorb a component or components. In practice, the component(s) which is (are) preferentially adsorbed, is (are) rarely ever the only component(s) adsorbed. For example, if the feed contains one part of a first component and one part of a second component, and 0.8 parts of the first component and 0.2 parts of the second component are adsorbed, the first component is selectively adsorbed.

The magnitude of the selective adsorption is expressed herein in terms of relative selectivity, that is, the ratio of two components in the adsorbed phase (extract) divided by the ratio of the same two components in the unadsorbed phase (raffinate). In other words, relative selectivity as used herein is defined by the following equation:

$$\text{Selectivity} = \frac{[\text{Concentration } M/\text{Concentration } N]_A}{[\text{Concentration } M/\text{Concentration } N]_U}$$

where M and N are two components of the feed represented in volume or weight percent and the subscripts A and U represent the adsorbed and unadsorbed phases respectively. When the selectivity is 1.0, there is no preferential adsorption of one component over the other. A selectivity larger than 1.0 indicates preferential adsorption of component M; in other words, the extract phase is enriched in M and the raffinate phase is enriched in N. The farther removed the selectivity is from 1.0, the more complete the separation.

The amount selectively associated per unit volume of adsorbent in a batch equilibrium test (mixing of feed dissolved in solvent with adsorbent for up to one hour or until no further change in the chemical composition of the liquid phase occurs) is the static capacity of the adsorbent. An advantage in static capacity indicates a potential advantage in dynamic capacity. Dynamic capacity is the production rate in continuous operation in apparatus of predetermined size to obtain predetermined purity product(s).

The meaning of the terms "triglyceride of higher Iodine Value" and triglyceride of lower Iodine Value" as used herein depends on the context of the application of the invention. The "triglyceride of higher Iodine Value" has to include the triglyceride of highest Iodine Value and can and often does consist of a plurality of triglycerides of different Iodine Values. The "triglyceride of lower Iodine Value" has to include the triglyceride of lowest Iodine Value (e.g. saturated triglyceride, i.e., triglyceride having all fatty acid moieties having saturated carbon chains, if such is present in the mixture being separated) and can and often does consist of a plurality of triglycerides of different Iodine Values. The important point is that the separation is one on the basis of Iodine Value.

The term "Iodine Value" is used in its normal meaning in relation to degree of unsaturation of fats and is described fully in Swern, *Bailey's Industrial Oil and Fat Products,* Interscience, 3rd edition, pages 63 and 64.

The composition of triglyceride mixtures is sometimes referred to herein as containing a percentage of particular fatty acid moiety "on a methyl ester basis" or "on a fatty methyl ester basis" or is defined "on a methyl ester basis" as containing percentages of methyl esters. Such percentages are obtained by determining the weight percentage of particular methyl ester in the methyl ester mixture obtained by converting triglyceride fatty acid moieties into corresponding methyl esters. Thus, for example, a triglyceride mixture containing 7% linolenic acid moiety on a methyl ester basis means that the methyl ester mixture obtained on converting the fatty acid moieties of such triglyceride mixture contains by weight 7% methyl linolenate.

The term "solvent" as used herein refers both to solvent blends (i.e., solvents consisting of a plurality of constituents) and to pure compounds, (i.e., solvents consisting of a single constituent) unless the context indicates otherwise.

The terms "solubility parameter", "solubility parameter dispersion component", "solubility parameter polar component" and "solubility parameter hydrogen bonding component" as used herein are defined by equations 6–10 at page 891 of Kirk-Othmer, *Encyclopedia of Chemical Technology,* 2nd edition, Supplement Volume, published by Interscience Publishers (John Wiley & Sons), New York, 1971. Values herein for solubility parameter, solubility parameter dispersion component, solubility parameter polar component and solubility parameter hydrogen bonding component are for solvents at 25° C. (i.e., they are on a 25° C. basis). As on page 891, the symbols "$\delta$", "$\delta_D$", "$\delta_P$", and "$\delta_H$" are used herein to refer respectively to "solubility parameter", "solubility parameter dispersion component", solubility parameter polar component", and "solubility parameter hydrogen bonding component". For many solvents the values for $\delta_D$, $\delta_P$ and $\delta_H$ are given in Table I which directly follows page 891 and the value for $\delta$ is calculated using equation (6) on page 891. For solvents consisting of a plurality of constituents, the values for "$\delta_D$", "$\delta_P$", and "$\delta_H$" are calculated by summing the corresponding values for the constituents multiplied by their volume fractions and the value for "$\delta$" is calculated using equation (6) on page 891.

The "surface area" of the silica gel is measured by the B.E.T. nitrogen adsorption technique described in Brunauer, Emmett and Teller, *J. Am. Chem. Soc.* 60, p. 309 (1938).

The "mean pore diameter" of the silica gel is determined by determining pore volume, determining surface area as described above, assuming that the pores are cylindrical and that the entire surface area consists of the surface of cylindrical pores, and solving simultaneous equations. Pore volume is readily determined by techniques well known in the art (see, for example, *Introduction to Powder Surface Area,* S. Lowell, John Wiley & Sons, N.Y. 1979).

The term "surface-silicon atom" as used herein means a silicon atom attached to only three other silicon atoms by Si—O bonds.

Determination of the ratio of surface-silicon atoms to aluminum atoms in the surface aluminated silica gel adsorbent is readily carried out by determining the number of surface-silicon atoms assuming the presence of 8 silicon atoms per square nanometer of surface area (the figure of 8 silicon atoms per square nanometer of surface area is found, for example, in Iler, R. K. *The Colloid Chemistry of Silica and Silicates,* Cornell University Press, Ithaca, New York 1955, p. 58) of the silica gel from which the adsorbent is derived and determining the number of aluminum atoms, for example, utilizing elemental analysis, and calculating.

The term "cation substituents" means the exchangeable cations associated with the adsorbent. The "cation substituents capable of forming $\pi$ complexes" are cation substituents capable of attracting and holding unsaturated materials (the greater the degree of unsaturation, the greater the attracting and holding power) by formation of a particular kind of chemisorption bonding known as $\pi$ bonding. The "cation substituents not capable of forming $\pi$ complexes" do not have significant ability to form such chemisorption bonds. The formation of $\pi$ complexes is considered to involve two kinds of bonding: (1) overlap between occupied $\pi$ molecular orbital of an unsaturate and an unoccupied d orbital or dsp-hybrid orbital of a metal and (2) overlap between an unoccupied antibonding $\pi^*$ molecular orbital of the unsaturate and one of the occupied metal d or dsp-hybrid orbitals (sometimes referred to as "back bonding"). This $\pi$ complexing is described, for example, in Chem. Revs. 68, pp. 785–806 (1968).

The term "adsorbent surface area" as used hereinafter in defining silver substituents level is also measured by the B.E.T. nitrogen adsorption technique referred to above and is measured on the adsorbent after silvering and moisture adjustment.

The level of silver substituents is referred to hereinafter in terms of millimoles/100 square meters of adsorbent surface area. This is determined by determining the amount of silver (e.g. by elemental microanalysis or utilizing X-ray fluorescence), by obtaining the adsorbent surface area as described above and calculating.

The term "moisture content" as used herein in relation to the adsorbent means the water present in the particles of adsorbent according to measurement by Karl Fischer titration or by determining weight loss on ignition at 400° C. for 2–4 hours. The moisture content values presented herein are percentages by weight.

DETAILED DESCRIPTION

The triglycerides in the feed have the formula

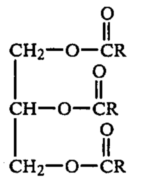

in which each R is aliphatic chain which contains 5 to 25 carbon atoms and is the same or different within a molecule. The aliphatic chains can be saturated or unsaturated. The unsaturated aliphatic chains are usually mono-, di- or triunsaturated.

The triglyceride mixtures for feed into a one stage process or into the first stage of a multistage process can be or are readily derived from naturally occurring fats and oils such as, for example, butter, corn oil, cottonseed oil, lard, linseed oil, olive oil, palm oil, palm kernel oil, peanut oil, rapeseed oil, safflower oil (both regular and high oleic), sardine oil, sesame oil, soybean oil, sunflower oil and tallow.

It is important that the triglyceride feedstock is essentially free of impurities such as gums, free fatty acids, mono- and diglycerides, color bodies, odor bodies, etc. which can foul (i.e. deactivate) the adsorbent thereby causing loss of fractionating performance. Such impurities are non-triglycerides which would be preferentially adsorbed and not desorbed thereby inactivating adsorption sites. The clean-up of the feedstock is accomplished by numerous techniques known in the art, such as alkali refining, bleaching with Fuller's Earth or other active adsorbents, vacuum-steam stripping to remove odor bodies, etc.

One very important feedstock is refined and bleached sunflower oil.

Another important feedstock is refined, bleached and deodorized soybean oil containing from about 6.5% to about 8.5% by weight of linolenic acid moiety on a fatty methyl ester basis and having an Iodine Value ranging from about 130 to about 150.

Still another important feedstock is refined, bleached and deodorized safflower oil (essentially free of wax and free fatty acids).

In a one solvent process, the feed is usually introduced into the adsorbing unit without solvent and is dissolved in solvent already in the unit, introduced, for example, in a previous cycle to cause desorption. If desired, however, the feed in a one solvent process can be dissolved in solvent prior to introduction into the adsorbing unit or the feed can be raffinate or extract from a previous stage comprising triglyceride mixture dissolved in solvent. In a two solvent process, the feed is preferably dissolved in the solvent constituting the vehicle for adsorption prior to introduction into the adsorbing unit.

Turning now to the solvents useful herein for a one solvent process (where the same solvent composition performs the dual role of being the dissolving phase during adsorption and the vehicle for desorption), these are preferably characterized by $\delta$ ranging from about 7.0 to about 10.5, $\delta_D$ ranging from about 7.0 to about 9.0, $\delta_P$ ranging from about 0.2 to about 5.1 and $\delta_H$ ranging from about 0.3 to about 7.4. More preferred solvents for use in a one solvent process herein are characterized by $\delta$ ranging from about 7.4 to about 9.0, $\delta_D$ ranging from about 7.25 to about 8.0, $\delta_P$ ranging from about 0.5 to about 3.0 and $\delta_H$ ranging from about 0.7 to about 4.0.

One important group of solvents for a one solvent process includes those consisting essentially by volume of from 0% to about 90% $C_5$–$C_{10}$ saturated hydrocarbon (that is, saturated hydrocarbon with from 5 to 10 carbon atoms) and from 100% to about 10% carbonyl group containing compound selected from the group consisting of (a) ester having the formula

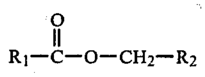

wherein $R_1$ is hydrogen or alkyl chain containing one or two carbon atoms and $R_2$ is hydrogen or alkyl chain containing one to three carbon atoms and (b) ketone having the formula

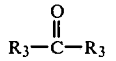

wherein each $R_3$ is the same or different and is alkyl chain containing 1 to 5 carbon atoms. Examples of suitable hydrocarbons are pentane, hexane, heptane, octane, nonane, decane, isopentane and cyclohexane. Examples of esters suitable for use in or as the solvent are methyl formate, methyl acetate, ethyl acetate, methyl propionate, propyl formate and butyl formate. Examples of ketones suitable for use in or as the solvent are acetone, methyl ethyl ketone, methyl isobutyl ketone and diethyl ketone.

Another important group of solvents for a one solvent process are dialkyl ethers containing 1 to 3 carbon atoms in each alkyl group and blends of these with the hydrocarbon, ester and ketone solvents set forth above. Specific examples of solvents within this group are diethyl ether and diisopropyl ether.

Yet another important group of solvents for a one solvent process are blends of $C_{1-3}$ alcohols (e.g. from about 5% to about 40% by volume alcohol) with the hydrocarbon, ester and ketone solvents set forth above. Specific examples of solvents within this group are blends of methanol or ethanol with hexane.

Very preferably, the solvent for a one solvent process comprises ethyl acetate with blending with hexane being utilized to weaken the solvent and blending with ethanol being utilized to strengthen the solvent.

In most continuous one solvent processes envisioned within the scope of the invention, the solvent is introduced into the process in a desorbing zone and sufficient solvent remains in the process to perform at a downstream location the dissolving function for adsorption.

The solvent to feed ratio for a one solvent process generally ranges on a volume basis from about 4:1 to about 100:1 and preferably ranges from about 5:1 to about 40:1.

We turn now to the solvents useful herein for a two solvent process (where different solvent compositions are used as the dissolving phase during adsorption and as the vehicle for desorption).

For a two solvent process herein, the solvents for use as the dissolving phase during adsorption, i.e., as the adsorption vehicle, are preferably characterized by $\delta$ ranging from about 7.3 to about 14.9, $\delta_D$ ranging from about 7.3 to about 9.0, $\delta_P$ ranging from 0 to about 5.7 and $\delta_H$ ranging from 0 to about 11.0. More preferred solvents for the adsorption vehicle for a two solvent process herein are characterized by δ ranging from about 7.3 to about 9.0, $\delta_D$ ranging from about 7.3 to about 8.0, $\delta_P$ ranging from 0 to about 2.7 and $\delta_H$ ranging from 0 to about 3.6. Very preferably, the solvent for the adsorption vehicle in a two solvent process herein is hexane or a blend consisting essentially of hexane and up to about 15% by volume ethyl acetate or diisopropyl ether.

For a two solvent process herein, the solvents for use as the vehicle for desorption, i.e., as the desorbent, are preferably characterized by δ ranging from about 7.4 to about 15.0 and at least 0.1 greater than the δ of the adsorption vehicle, $\delta_D$ ranging from about 7.3 to about 9.0, $\delta_P$ ranging from about 0.3 to about 6.0 and at least 0.3 greater than the $\delta_P$ of the adsorption vehicle, and $\delta_H$ ranging from about 0.5 to about 11.5 and at least 0.5 greater than the $\delta_H$ of the adsorption vehicle. More preferred solvents for the desorbent for a two solvent process herein are characterized by a δ ranging from about 7.4 to about 10.0, $\delta_D$ ranging from about 7.3 to about 8.0, $\delta_P$ ranging from about 0.5 to about 4.0, and $\delta_H$ ranging from about 0.5 to about 6.0 and having δ, $\delta_P$ and $\delta_H$, respectively, greater than the δ, $\delta_P$ and $\delta_H$ of the adsorption vehicle by at least the amounts stated above. Important desorbents for use in a two solvent process herein include: ethyl acetate; blends consisting essentially of ethyl acetate and up to about 80% by volume hexane; blends consisting essentially of ethyl acetate and up to about 25% by volume methanol or ethanol; and diisopropyl ether. Very preferably, the solvent for the desorbent in a two solvent process herein comprises ethyl acetate.

It is preferred both in a one solvent process herein and in a two solvent process herein to avoid use of halogenated hydrocarbon solvents as these shorten adsorbent life.

We turn now in detail to the adsorbent for use herein. It is defined the same regardless of whether it is used in a one solvent process or in a two solvent process.

The bonding of aluminate groups to surface-silicon atoms of the silica gel from which adsorbent herein is derived to provide the adsorbent herein characterized by aluminum atoms present essentially entirely in anionic moieties at the surface is indicated by the following chemical structure which is believed to represent anionic sites in such adsorbent:

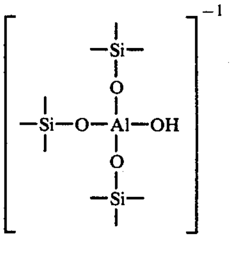

wherein the silicon atoms which are depicted are surface-silicon atoms. The cation substituents are associated with such anionic sites to provide electrostatic neutrality.

The characterization of the adsorbent in terms of mean pore diameter and surface area of the silica gel from which it is derived is important to obtaining appropriate dynamic capacity.

If adsorbent is used derived from silica gel starting material with a mean pore diameter of less than the aforestated lower limit of about 50 angstroms, dynamic capacity becomes quite low. This means that the separation is not as complete or that a large number of columns have to be used in the simulated moving bed unit operation described hereinafter or very low flow rates or long contact times are required to be used to obtain good separation. This is because with small diameter pores, the triglyceride cannot get into the interior in the time allotted and the accessible portions of the adsorbent become saturated and the partition coefficient approaches zero and mass transfer ceases. The silica gel surface area normally corresponding to a mean pore diameter of about 50 angstroms is about 600 square meters per gram.

If adsorbent is used derived from silica gel starting material having a surface area less than the aforestated lower limit of about 100 square meters per gram, both static and dynamic capacity become quite low. This means separation is poor even with low production rates, long processing times or a large number of columns. The silica gel mean pore diameter normally corresponding to a surface area of about 100 square meters per gram is about 200 angstroms.

Preferably, the adsorbent herein is derived from silica gel having a mean pore diameter of at least about 75 angstroms and a surface area of at least about 300 square meters per gram. The silica gel surface area normally corresponding to a mean pore diameter of about 75 angstroms is about 475 square meters per gram. The silica gel mean pore diameter normally corresponding to a surface area of about 300 square meters per gram is about 120 angstroms.

The characterization of the adsorbent herein in terms of ratio of surface-silicon atoms to aluminum atoms is important in relation to selectivity. The lower limit of about 3:1 is related to the chemical structure of the adsorbents herein; in such structure, aluminate moiety is associated with three silicon atoms. The upper limit of about 20:1 has been selected to provide sufficient adsorbing power to obtain selectivity in some fractionation envisioned. In most instances in important applications of this invention, the adsorbent preferably is characterized by a ratio of surface-silicon atoms to aluminum atoms ranging from about 3:1 to about 12:1.

We turn now to the cation substituents of the adsorbent.

The cation substituents capable of forming π complexes are preferably selected from the group consisting of silver (in a valence state of 1), copper (in a valence state of 1), platinum (in a valence state of 2), palladium (in a valence state of 2) and combinations of these.

The cation substituents not capable of forming π complexes are preferably selected from the group consisting of cation substituents from Groups IA and IIA of the Periodic Table and zinc cation substituents and combinations of these are very preferably are selected from the group consisting of sodium, potassium, barium, calcium, magnesium and zinc substituents and combinations of these.

Most preferably, the adsorbent has cation substituents selected from the group consisting of silver substituents in a valence state of one and sodium substituents and combinations of these.

Preferably, cation substituents such as hydrogen, which cause deterioration of the adsorbent structure (e.g. by stripping aluminum therefrom) should be avoided or kept at a minimum.

Fractionations are envisioned herein utilizing adsorbent with no cation substituents capable of forming $\pi$ complexes (e.g. together with a weak solvent as the adsorption vehicle). Such adsorbent functions by a physical adsorption mechanism to preferentially adsorb triglyceride of higher Iodine Value. Preferably, however, the adsorbent utilized has cation substituents capable of forming $\pi$ complexes as at least some of its cation substituents; these adsorbents function by a combination of physical adsorption and the type of chemical adsorption known as $\pi$ complexing to preferentially adsorb triglyceride of higher Iodine Value.

Very preferably, the adsorbent has a level of silver substituents greater than about 0.05 millimoles/100 square meters of adsorbent surface area. The upper limit on silver is found in a fully silver exchanged adsorbent with a ratio of surface-silicon atoms to aluminum atoms of about 3:1 and is about 0.44 millimoles/100 square meters of adsorbent surface area. Most preferably, the adsorbent has a silver level ranging from about 0.10 millimoles/100 square meters of adsorbent surface area to about 0.35 millimoles/100 square meters of adsorbent surface area. Amount of silver is readily measured utilizing X-ray fluorescence or elemental microanalysis.

The ratio of surface-silicon atoms to aluminum atoms and the level of cation substituents capable of forming $\pi$ complexes interrelate, and the selection of these governs adsorbing power and therefore selectivity. These also have an effect on static and on dynamic capacity.

The ratio of surface-silicon atoms to aluminum atoms selected sets the maximum amount of cation substituents capable of forming $\pi$ complexes that can be introduced. This is because the cation substituents are held by the negative charges associated with aluminum atoms in anionic moieties, with a monovalent cation substituent being held by the charge associated with a single aluminum atom and a divalent cation substituent being held by the charges associated with two aluminum atoms.

With the silica gel starting material surface area held constant, and with the level of cation substituents capable of forming $\pi$ complexes being held at the same percentage of exchange capacity, as the ratio of surface-silicon atoms to aluminum atoms is increased, the adsorbing power and capacity (static and dynamic) decreases. With the surface area of the silica gel starting material held constant and with the ratio of surface-silicon atoms to aluminum atoms held constant, increasing the level of cation substituents capable of forming $\pi$ complexes results in increasing adsorbing power and capacity (static and dynamic). With the ratio of surface-silicon atoms to aluminum atoms held constant and the level of cation substituents capable of forming $\pi$ complexes held constant, using adsorbent derived from silica gel of increased surface area increases capacity (static and dynamic) up to the point where increase in silica gel starting material surface area results in decrease in mean pore diameter to the extent that dynamic capacity is adversely affected.

The moisture content is important in the adsorbent because too much moisture causes the adsorbent to be oleophobic (water occupies pores of the adsorbent preventing feed from reaching solid surface of the adsorbent). The less the moisture content is, the greater the adsorbing power and capacity. The upper limit of about 10% by weight moisture content has been selected so that the adsorbent will perform with at least mediocre efficiency. Preferably, the moisture content in the adsorbent is less than about 4% by weight.

The adsorbents herein generally have particle sizes ranging from about 200 mesh to about 20 mesh (U.S. Sieve Series). Use of a particle size less than about 200 mesh provides handling problems and can result in loss of adsorbent as a result of very small particles forming a stable suspension in solvent. Use of a particle size greater than about 20 mesh results in poor mass transfer. For a continuous process, particle sizes of about 80 mesh to about 30 mesh (U.S. Sieve Series) are preferred; using particle sizes larger than about 30 mesh reduces resolution and causes diffusion (mass transfer) limitations and using particle sizes less than about 80 mesh results in high pressure drops. Preferably, there is narrow particle size distribution within the aforestated ranges to provide good flow properties.

We turn now to the preparation of the adsorbent.

The silica gel starting material is selected on the basis of mean pore diameter, surface area and particle size. As indicated above, the mean pore diameter must be at least about 50 angstroms, and the surface area must be at least about 100 square meters per gram. The particle size must be at least about 200 mesh since the adsorbent has a particle size approximately the same as the particle size of the silica gel particles which are reacted to provide the adsorbent. Thus, microparticulate silica gels are unacceptable for use in producing the adsorbent herein. Silica gel starting materials including particles with a size greater than 20 mesh are readily made useful, for example, by sieving out larger particles if only some are present or by size-reducing and sieving if a substantial part of the particles is too large. Preferred silica gel starting materials are sold under the tradenames Silica Gel 100 and Geduran (both are manufactured by E. Merck and Company) and Grade 59 Silica Gel (manufactured by the Davison Chemical Division of W. R. Grace). Silica Gel 100 and Geduran are obtainable in particle size of 35–70 mesh. Grade 59 Silica Gel is obtainable in a particle size of 3–8 mesh and must undergo size reduction and sieving.

The aluminate ion can be furnished by using a water soluble aluminate or a source thereof (in other words, the aluminate can be formed in situ). Preferred water-soluble aluminate reactants are sodium aluminate and potassium aluminate. Aluminate is suitably formed in situ, for example, by reacting cationic aluminum (e.g., from aluminum nitrate) with sodium hydroxide, or by reacting aluminum metal with sodium hydroxide.

The reaction involving aluminate ion and silica gel is suitably carried out as follows: Firstly, an aqueous solution of aluminate ion (or precursors thereof) is contacted with selected silica gel. The amount of aluminate ion is selected to provide the desired ratio of surface-silicon atoms to aluminum atoms. Reaction temperatures range, for example, from about 15° C. to about 100° C. and reaction times range, for example, from about 1 to about 48 hours. In one useful process, reaction is carried out at room temperature. In another useful process, boiling water (100° C.) is used as the reaction medium. Reaction is carried out to obtain the desired surface alumination. After the surface alumination is completed, it is desirable to wash the product, e.g. with distilled water, to remove excess aluminum salts.

Lam et al, cited above, suggest the following reaction equation:

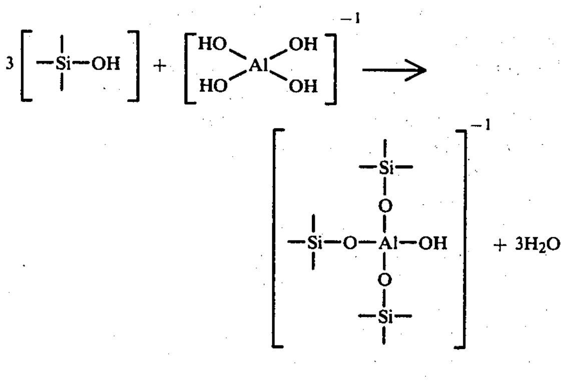

If the surface alumination reaction described above does not provide the proper cation substituents in the selected level, a cation exchange is carried out.

The cation exchange to provide a selected level of cation substituents capable of forming π complexes is readily carried out by contacting the aluminated material with a sufficient amount of cation that is desired to be introduced. When it is desired to introduce silver substituents to provide cation substituents capable of forming π complexes, the exchange is carried out in aqueous medium. Suitable sources of silver include silver nitrate which is preferred and silver fluoride, silver chlorate and silver perchlorate. When the level of cation desired to be introduced is substantially less than 100% of exchange capacity, reaction is preferably carried out in a stirred tank and a slight excess of cation (preferably 105–115% of stoichiometric) is desirably used. When the level of cation desired to be introduced approaches 100% of exchange capacity, reaction is preferably carried out in a packed column and a large excess (preferably 200% of stoichiometric) is used. Unreacted cation is readily washed from the product.

The moisture content is readily adjusted with conventional drying methods. For example, drying is readily carried out using vacuum or an oven (e.g. a forced draft oven). Drying is carried out to obtain the desired moisture level, e.g., by drying at a temperature of 100° C.–110° C. for 15–20 hours.

The particle size of the adsorbent is preferably adjusted by adjusting the particle size of the silica gel starting material, for example by sieving (screening) to obtain a narrow size distribution of particles within the aforedescribed range and by size reducing when such is appropriate. Particle size of adsorbent is readily controlled in this manner because particle size of the aluminated reaction product is essentially the same as that of the silica gel reactant. Less preferably, sieving or size-reduction can be carried out on aluminated reaction product or even on reaction product subsequent to cation treatment.

Turning now to the instant fractionation process, the selection of solvent(s), the ratio of surface-silicon atoms to aluminum atoms in the adsorbent and level of cation substituents capable of forming π complexes are interrelated and depend on the separation desired to be obtained. The lower the ratio of surface-silicon atoms to aluminum atoms in the adsorbent is, the greater the adsorbing power is. The higher the level of cation substituents capable of forming π complexes is, the greater the adsorbing power and the greater the resistance to desorption. The lower the solubility parameter and solubility parameter polar and hydrogen bonding components of the solvent utilized as the dissolving phase during adsorption are, the more adsorbing power a particular adsorbent is able to exert. The higher the solubility parameter and the solubility parameter polar and hydrogen bonding components of the solvent utilized as the vehicle for desorption are, the more the desorbing power. The higher the degree of unsaturation (and Iodine Value) of the fraction desired to be separated is, the higher the solubility parameter and solubility parameter polar and hydrogen bonding components of the solvent that can be used for adsorbing and that is required for desorbing and the higher the ratio of surface-silicon atoms to aluminum atoms and the lower the level of cation substituents capable of forming π complexes in the adsorbent that can be used for adsorbing and which will allow desorbing.

When a particular adsorbent has been selected, the solvent used during adsorbing should have a solubility parameter and solubility parameter components sufficiently low to obtain selectivity, and the solvent used for desorbing should have a solubility parameter and solubility parameter components sufficiently high to obtain desorption.

When a particular solvent or particular solvents has (have) been selected, an adsorbent is selected with a ratio of surface-silicon atoms to aluminum atoms sufficiently low and a level of cation substitutents capable of forming π complexes sufficiently high to provide desired selectivity during adsorption and with a ratio of surface-silicon atoms to aluminum atoms sufficiently high and a level of cation substituents capable of forming π complexes sufficiently low to allow desorption of all or desired portion of adsorbed triglyceride during the desorbing step.

We turn now to the conditions of temperature and pressure for the instant fractionation process. The temperatures utilized during adsorbing and during desorbing generally range from about 15° C. to about 200° C. A preferred temperature range to be used when the feed is a mixture of triglycerides having fatty acid moieties with aliphatic chains having from 12 to 20 carbon atoms, is 50° to 80° C. and temperatures as low as about 40° C. may provide an advantage especially when triunsaturated moiety is present. The pressures utilized during adsorbing and desorbing can be the same and generally are those pressures encountered in packed bed processing, e.g., ranging from atmospheric (14.7 psia) to about 500 psia. For a simulated moving bed process as described hereafter, the pressures utilized preferably range from about 30 psia to about 120 psia or are as prescribed by the desired flow rate.

For a batch process, sufficient residence time should be provided to obtain appropriate yields and purities, usually 15 minutes to 20 hours. The rates for continuous processing are a function of the size of the equipment, the resolving ability of the adsorbent-solvent pair, and the desired yield and purity.

The fractionation process herein as described above provides a "raffinate" and an "extract". The raffinate contains fraction which is enriched in content of triglyceride of lower Iodine Value. It comprises triglyceride which was weakly attracted by the adsorbent, dissolved in solvent. The extract contains fraction enriched in content of triglyceride of higher Iodine Value. It comprises triglyceride which was more strongly attracted by the adsorbent, dissolved in solvent. The fractions of triglyceride can be recovered from the raffinate and from the extract by conventional separation process such as by stripping solvent with heat, vacuum and/or steam.

We turn now to apparatus for a one solvent process herein and its operation.

For batch processing, the one solvent process herein is readily carried out in equipment conventionally used for adsorption carried out batch-wise. For example, such processing can be carried out utilizing (a) introducing feed dissolved in solvent to obtain selective adsorption and (b) introducing solvent to obtain desorption of adsorbed fraction.

For continuous processing, the one solvent process herein is readily carried out in conventional continuous adsorbing apparatus and is preferably carried out by means of a simulated moving bed unit operation. A simulated moving bed unit operation and apparatus for such useful herein is described in Broughton et al U.S. Pat. No. 2,985,589.

For a simulated moving bed embodiment of this invention, preferred apparatus includes: (a) at least four columns connected in series, each containing a bed of adsorbent; (b) liquid access lines communicating with an inlet line to the first column, with an outlet line from the last column, and with the connecting lines between successive columns; (c) a recirculation loop including a variable speed pump, to provide communication between the outlet line from the last column and the inlet line to the first column; and (d) means to regulate what flows in or out of each liquid access line.

Such preferred simulated moving bed apparatus is operated so that liquid flow is in one direction and so that countercurrent flow of adsorbent is simulated by manipulation of what goes into and out of the liquid access lines. In one embodiment, the apparatus is operated so that four functional zones are in operation. The first of the functional zones is usually referred to as the adsorption zone. This zone is downstream of a feed inflow and upstream of a raffinate outflow. In the adsorption zone, there is a net and selective adsorption of triglyceride of higher Iodine Value and a net desorption of solvent and of triglyceride of lower Iodine Value. The second of the functional zones is usually referred to as the purification zone. It is downstream of an extract outflow and upstream of the feed inflow and just upstream of the adsorption zone. In the purification zone, triglyceride of higher Iodine Value which has previously been desorbed is preferentially adsorbed and there is a net desorption of solvent and of triglyceride of lower Iodine Value. The third of the functional zones is referred to as the desorption zone. It is downstream of a solvent inflow and upstream of extract outflow and just upstream of the purification zone. In the desorption zone, there is a net desorption of triglyceride of higher Iodine Value and a net adsorption of solvent. The fourth functional zone is usually referred to as the buffer zone. It is downstream of the raffinate outflow and upstream of the solvent inflow and just upstream of the desorption zone. In the buffer zone, triglyceride of lower Iodine Value is adsorbed and solvent is desorbed. The various liquid access lines are utilized to provide the feed inflow between the purification and adsorption zones, the raffinate outflow between the adsorption and buffer zones, solvent inflow between the buffer and desorption zones and extract outflow between the desorption and purification zones. The liquid flow is manipulated at predetermined time periods and the speed of the pump in the recirculation loop is varied concurrent with such manipulation so that the inlet points (for feed and solvent) and the outlet points (for raffinate and extract) are moved one position in the direction of liquid flow (in a downstream direction) thereby moving the aforedescribed zones in the direction of liquid flow and simulating countercurrent flow of adsorbent. In another embodiment of simulated moving bed operation, a plurality of successive desorption zones is utilized (in place of a single desorption zone) with solvent being introduced at the upstream end of each desorption zone and extracted being taken off at the downstream end of each desorption zone. It may be advantageous to use different solvent inlet temperatures and/or different solvents for different desorption zones.

In another embodiment of simulated moving bed operation, raffinate is taken off at a plurality of locations along the adsorption zone.

Less preferred continuous simulated moving bed apparatus than described above is the same as the apparatus described above except that the recirculation loop is omitted. The buffer zone can also be omitted.

In the operation of the above described simulated moving bed processes, the relative number of columns in each zone to optimize a process can be selected based on selectivities and resolution revealed by pulse testing coupled with capacity and purity requirements. A factor in selecting the number of columns in the adsorption zone is the percentage of the feed to be adsorbed. The purity of the extract and raffinate streams is a function of the number of columns in the adsorption zone. The longer the adsorption zone is (the more columns in it), that is, the further removed the feed inlet is from the raffinate outlet, the purer the raffinate is.

In the operation of the above described simulated moving bed processes, the time interval between manipulations of liquid flow should be sufficient to allow a substantial proportion of triglyceride of higher Iodine Value to stay in the adsorption zone and a substantial proportion of triglyceride of lower Iodine Value to leave.

We turn now to apparatus for the two solvent process herein and its operation.

Such two solvent process is preferably carried out using a column loaded with adsorbent. The feed and the solvent constituting the adsorption vehicle are run through the column until a desired amount of feed is adsorbed. Then, the desorbing solvent is run through the column to cause desorption of adsorbed material.

Such two solvent process is less preferably carried out, for example, in a batch mixing tank containing the adsorbent. The feed together with solvent constituting the adsorption vehicle is added into the tank. Then mixing is carried out until a desired amount of adsorption occurs. Then liquid is drained. Then desorbing solvent is added and mixing is carried out until the desired amount of desorption occurs. Then solvent containing the desorbed triglyceride is drained.

We turn now in more detail to the important process referred to earlier involving sunflower oil. The feed is refined and bleached sunflower oil; it contains from about 9% to about 12% by weight saturated fatty acid moiety (palmitic acid moiety and stearic acid moiety) on a methyl ester basis. The adsorbent for this process is that generally described above. Preferably, the adsorbent is one derived from silica gel having a mean pore diameter of at least about 75 angstroms and a surface area of at least about 300 square meters per gram and is further characterized by a ratio of surface-silicon atoms to aluminum atoms ranging from about 3:1 to about 10:1, a level of silver cation substituents in a valence state of 1 ranging from about 0.10 millimoles/ 100 square meters of adsorbent surface area to about 0.35 millimoles/100 square meter of adsorbent surface area with any remainder of cation substituents being sodium substituents, and a moisture content less than about 4% by weight. The temperature used during adsorbing and during desorbing preferably ranges from about 50° C. The processing is preferably carried out continuously in a one solvent process in a simulated moving bed unit operation as described above utilizing a pressure ranging from about 30 psia to about 120 psia or a prescribed by the desired flow rate. The solvent for a one solvent process is that generally described above for a one solvent process and preferably comprises ethyl acetate. The extract obtained contains triglyceride mixture containing less than about 3.5% by weight saturated fatty acid moiety on a fatty methyl ester basis. Product recovered from the extract is suitable for a salad or cooking oil.

We turn now in more detail to the important process referred to earlier involving soybean oil feed. As indicated earilier the feed is soybean oil (refined, bleached and deodorized soybean oil) containing from about 6.5% to about 8.5% by weight linolenic acid moiety (on a fatty methyl ester basis) and having an Iodine Value ranging from about 130 to 150. The adsorbent for this process is that generally described above. Preferably, the adsorbent is one derived from silica gel having a mean pore diameter of at least about 75 angstroms and a surface area of at least about 300 square meters per gram and is further characterized by a ratio of surface-silicon atoms to aluminum atoms ranging from about 3:1 to about 10:1, a level of silver cation substituents in a valence state of 1 ranging from about 0.10 millimoles/100 square meters of adsorbent surface area to about 0.35 millimoles/100 square meters of adsorbent surface area with any remainder of cation substituents being sodium substituents, and a moisture content less than about 4% by weight. The temperature used during adsorbing and during desorbing preferably ranges from about 50° C. to about 80° C., and temperatures as low as about 40° C. can sometimes provide an advantage. The processing is preferably carried out continuously in a one solvent process in a simulated moving bed unit operation as described above utilizing a pressure ranging from about 30 psia to about 120 psia or as prescribed by the desired flow rate. The solvent for a one solvent process is that generally described above for a one solvent process and preferably is ethyl acetate or a blend of ethyl acetate and hexane. The raffinate obtaining contains triglyceride mixture containing from 0% to about 5% linolenic acid moiety by weight on a fatty methyl ester basis and having an Iodine Value ranging from about 80 to about 125. Product recovered from the raffinate is competitive with touch hardened soybean oil in relation to rancidity and odor problems and avoids entirely the problems associated with touch hardening of processing to remove nickel catalyst and hydrogenation odor and cis to trans isomerization and double bond position changes. In other words, the product obtained from the process of the invention contains no trans double bonds and no double bonds in positions different from those in the feedstock. Fraction obtained from extract is an excellent drying oil.

We turn now in more detail to the multistage processing referred to generally above.

Multistage processing can involve the following. The feedstock to be separated is processed in a first stage to obtain first extract containing fraction enriched (compared to the feedstock) in content of triglyceride of higher Iodine Value and first raffinate containing fraction enriched (compared to the feedstock) in content of triglyceride of lower Iodine Value and depleted (completed to the feedstock) in content of triglyceride of higher Iodine Value. The first raffinate or first extract, preferably the triglyceride fraction obtained by essentially completely removing solvent from first raffinate or first extract, is processed in the second stage to obtain second extract containing fraction enriched in content of triglyceride of higher Iodine Value (compared to the feed to the second stage) and second raffinate enriched (compared to the feed to the second stage) in content of triglyceride of lower Iodine Value and depleted (compared to the feed to the second stage) in content of triglyceride of higher Iodine Value. To the extent succeeding stages are used, each succeeding stage has as its feed raffinate or extract from the preceding stage, preferably triglyceride fraction obtained by essentially completely removing solvent from such.

We turn now to advantages of the process herein.

Significant advantages result from the chemical composition and structure of the adsorbent herein. Firstly, such adsorbent is made from materials which are readily commercially available in large amounts. Secondly, flexibility in adsorbent composition is readily provided in that silica gels with different pore sizes and surface areas are readily available and in that a predetermined ratio of surface-silicon atoms to aluminum atoms is readily obtained. Thirdly, level of cations capable of forming $\pi$ complexes can be readily regulated by selecting the ratio of surface-silicon atoms to aluminum atoms. Fourthly, any cations capable of forming $\pi$ complexes are situated at the surface of the adsorbent where such are available to provide adsorbing power thereby providing efficient usage of such cations (e.g. silver).

Furthermore, the process herein is characterized by a long adsorbent life cycle. Firstly, there is no problem of cations capable of forming $\pi$ complexes being leached from the adsorbent as there is with silver nitrate treated silica gel adsorbents. This is because the cations are attached in the adsorbent by electrostatic interaction. Secondly, there is no fouling of the adsorbent with impurities. Thirdly, the adsorbent has physical strength such that it does not break down into smaller pieces.

Furthermore, the adsorbent herein is advantageous over crystalline zeolite adsorbents from the standpoints of flexibility and dynamic capacity and is advantageous over resin adsorbents from the standpoints of flexibility, dynamic capacity, cost, and of being inorganic in nature.

Moreover, processing is carried out without any significant amount of polymerization so that there is no problem of disposing of polymer by-product.

Furthermore, the process herein is carried out without the adsorbent handling and loss problems which can be associated with use of miccroparticulate particle size adsorbents.

The invention is illustrated in the following specific examples.

In Example I below, a "pulse test" is run to determine the quality of separation that can be obtained in one solvent processing with selected adsorbent and solvent. The apparatus consists of a column having a length of 120 cm. and an inside diameter of 1 cm. and having inlet and outlet ports at its opposite ends. The adsorbent is dispersed in solvent and then introduced into the column. The column is packed with about 100 cc. of adsorbent on a wet packed basis. The column is in a temperature controlled environment. A constant flow pump if used to pump liquid through the column at a predetermined flow rate. In the conducting of the test, the adsorbent is allowed to come to equilibrium with the solvent and feed by passing a mixture of the solvent and feed through the column for a predetermined period of time. The adsorbent is then flushed with solvent until a 5 milliliter fraction contains a negligible amount of feed. At this time, a pulse of feed containing a known amount of docosane tracer is injected, via a sample coil, into the solvent inflow. The pulse of feed plus tracer is thereby caused to flow through the column with components first being adsorbed by the adsorbent and then caused to be desorbed by the solvent. Equal volume effluent samples are collected, and triglyceride therefrom is converted to methyl ester which is analyzed by gas chromatography. From these analyses, elution concentration curves for tracer and triglyceride components are obtained (concentration in milligrams per milliliter is plotted on the y axis and elution volume in milliliters is plotted on the x axis). The distance from time zero (the time when the pulse of feed plus tracer is introduced) to the peak of a curve is the elution volume. The difference between the elution volume for a triglyceride component and the elution volume for the tracer is the retention volume of that triglyceride component. The relative selectivity of one triglyceride component over another is the ratio of their respective retention volumes.

In Examples II–IV, pilot plant test apparatus (sometimes referred to as a demonstration unit) is utilized. The apparatus is operated according to the continuous simulated moving bed unit operation mentioned above to carry out a one solvent process. The apparatus comprises columns which are connected in series in a loop to permit the process liquid to flow in one direction. Each column has a length of 24 inches and an inside diameter of 9/10 of an inch and is loaded with about 237 cc. of adsorbent (wet packed basis). Each column is equipped with four-position valves (top and bottom) connected to four inlet and four outlet conduits. When a valve is closed, liquid flows only toward the column downstream of the valve. By selecting between the eight open positions (four at top and four at bottom), feed can be caused to be introduced to the system (e.g. position 1), solvent can be caused to be introduced to the system (e.g. position 2), a raffinate stream can be removed from the system (e.g. position 3), an extract stream can be removed from the system (e.g. position 4) or a solvent stream can be removed from the system (e.g. position 5). Backflow check positions are located in each of the bottom valves. These are used to isolate zones of the system from backflow; i.e., isolate the high pressure inlet (solvent, from the low pressure outlet. Operation is as follows: At any time, the apparatus constitutes a single stage. It is operated with four working zones (adsorption, purification, desorption, and buffer). One backflow control valve is always in closed position to eliminate backflow between the solvent inlet and the low pressure outlet. No recirculation is used. The columns are apportioned between the adsorption, purification, desorption, and buffer zones with a selected number of columns in series comprising each zone. Feed is introduced into the first column of the adsorption zone and is dissolved in solvent and is contacted with adsorbent. As liquid flows downstream through the adsorption zone, triglyceride component(s) of higher Iodine Value is (are) selectively adsorbed leaving raffinate enriched in triglyceride of lower Iodine Value. In the purification zone, non-adsorbed components are forced from the adsorbent and are thus forced downstream toward the feed point. The extract is removed at the inlet to the purification zone and is enriched in adsorbed components. The solvent is added at the inlet to the desorption zone and causes desorption of adsorbed component(s) from the adsorbent for removal downstream at the extract point. In the buffer zone, triglyceride is adsorbed and solvent is desorbed. A stream denoted herein as a solvent outlet stream and consisting mostly of solvent is taken off at the outlet from the buffer zone. At selected intervals a controller advances the flow pattern (into and out of columns) one column (in other words, the controller manipulates valves so that raffinate outflow, feed inflow, extract outflow, solvent inflow and solvent outflow points each advance one step, that is, to the next liquid access point in the direction of liquid flow) to "step forward" to keep pace with the liquid flow. A cycle consists of the number of steps equal to the number of columns. The "step time" is chosen such as to allow the non-adsorbed components to advance faster than the feed point and reach the raffinate point. The adsorbed triglyceride moves slower than the feed point and falls behind to the extract point.

In Example V below, apparatus and operation are generally as described above for Examples II–IV except that no buffer zone is used and there is no solvent outlet stream.

In Example VI below, apparatus and operation are generally as described above for Examples II–IV except that two desorption zones are used, one following the other, with solvent being introduced at the upstream end of each desorption zone and extract being removed at the downstream end of each desorption zone. Thus, Example VI is operated with five working zones (i.e. an adsorption zone, a purification zone, a first desorption zone, a second desorption zone and a buffer zone) and with seven streams (a feed introduction stream at the upstream end of the adsorption zone, a raffinate outlet stream at the downstream end of the adsorption zone, a solvent outlet stream at the downstream end of the buffer zone, a first solvent inlet stream at the upstream end of the first desorption zone, a first extract outlet stream at the downstream end of the first desorption zone, a second solvent inlet stream at the upstream end of the second desorption zone, and a second extract outlet stream at the downstream end of the second desorption zone).

In Example VII below, a test is run to demonstrate selection of solvents for a two solvent process once a particular adsorbent has been selected. The apparatus utilized is the same as that utilized in the run of Example I, and as in Example I, the column is packed with about 100 cc. of adsorbent (wet packed basis). The following procedure is utilized. A plurality of solvents is utilized successively, each being of progressively increasing desorbing power. The initial solvent is pumped through the column at 5 ml/minute with the column temperature being 50° C. 2.0 gms of feed (0.1 gram docosane tracer and 1.9 gms triglyceride mixture) is dissolved in 10 ml. of the initial solvent. Flow through the column is stopped, and the 10 ml. of initial solvent with feed dissolved therein is injected into the column entrance. Flow of initial solvent is then restarted and effluent sample collection is begun. After approximately two column volumes of the initial solvent is pumped into the column, the solvent is changed and approximately two column volumes of the second solvent is pumped into the column. The solvent is successively changed after two column volumes of a solvent is pumped until all the solvents being tested have been pumped into the column. Eluant samples are collected, and the triglyceride therefrom is converted to methyl ester which is analyzed by gas chromatography.

We turn now to the Examples I–VIII which are generally described above.

EXAMPLE I

The "pulse" consists of 0.5 ml solvent and 0.5 ml of triglyceride plus tracer. The triglyceride plus tracer consists by weight of 45% triolein, 45% trilinolein and 10% docosane tracer. The "pulse" is free of impurities which can foul the adsorbent.

The adsorbent has the following characteristics: It is derived from silica gel having a mean pore diameter of approximately 100 angstroms and a surface area of 346 square meters per gram. It is further characterized by a ratio of surface-silicon atoms to aluminum atoms of 6.4:1, moisture content less than 2% by weight, and a particle size of 35–70 mesh (U.S. Sieve Series). It contains sodium substituents as all of its cation substituents.

The adsorbent is made as follows: Silica Gel 100 (35–70 mesh U.S. Sieve Series) is utilized. 1000 grams of the silica gel and 2 liters of distilled water are charged into a 5.0 liter, 3-neck, fluted flask fitted with a mechanical stirrer, a pH electrode, and an addition funnel. The mixture is agitated to form a homogeneous slurry. The pH of the slurry is adjusted to 9.5 with 10% aqueous sodium hydroxide solution. Then, a freshly prepared solution of sodium aluminate (108.6 gm) in distilled water (2.0 liters) is added. The slurry is stirred 10 hours at room temperature (about 20° C.). Then stirring is stopped and the mixture is allowed to stand overnight. The resulting product is poured into a glass chromatographic column and washed free of unreacted aluminate with distilled water (1–2 ml per minute). Washing is continued until the pH of the effluent is about 9.0. The solid is suction filtered to remove bulk water and then dried in a forced-draft oven (105°–110° C.) overnight.

The solvent consists by volume of 80% hexane and 20% ethyl acetate. For this solvent blend: $\delta=7.43$, $\delta_d=7.38$, $\delta_P=0.52$ and $\delta_H=0.70$.

In the run, solvent is pumped continuously through the column at a rate of 6.2 ml per minute. At time zero, the sample pulse as described above is introduced by means of the sample coil into the solvent flow. The equal volume samples that are collected are each 6.2 ml (one sample per minute).

The run is carried out at 50° C.

Retention volumes are obtained as follows: for triolein, 12.40 ml; for trilinolein, 18.60 ml.

The relative selectivity for trilinolein/triolein is 1.50.

The above indicates separation on the basis of Iodine Value.

At the peak for trilinolein in the elution concentration curve, the percent purity is 68% trilinolein. This indicates resolution such that the use of multiple stages with the tested solvent and adsorbent combination in continuous simulated moving bed processing would be preferred and further indicates that silvered adsorbent would more appropriately be used.

EXAMPLE II

This example illustrates separation of soybean oil triglycerides into raffinate fraction containing a reduced percentage of triglyceride with linolenic acid moiety and an extract fraction. The run of this example is carried out utilizing continuous simulated moving bed processing.

The feed composition is refined, bleached and deodorized soybean oil. It contains by weight on a methyl ester basis 10.03% methyl palmitate, 4.08% methyl stearate, 24.62% methyl oleate, 54.73% methyl linoleate, and 6.54% methyl linolenate. It has an Iodine Value of 139.10. It is free of impurities which can foul the adsorbent.

The adsorbent has the following characteristics: It is derived from silica gel having a mean pore diameter of approximately 100 angstroms and a surface area of 346 square meters per gram. It is also characterized by a ratio of surface-silicon atoms to aluminum atoms of 6.4:1, a moisture content less than 2% by weight, and a particle size of 35–50 mesh (U.S. Sieve Series). It contains 0.27 millimoles of silver (in the form of cation substituents in a valence state of 1) per 100 square meters of adsorbent surface area. The silver substituents make up 67.6% of the exchangeable cations. The remainder of the exchangeable cations are sodium substituents. The surface area of the final adsorbent is 233 square meters per gram.

The adsorbent is made as follows: Silica Gel 100 is screened to provide a fraction of 35–50 mesh particle size. 1000 grams of such fraction and 2 liters of distilled water are charged into a 5.0 liter, 3-neck, fluted flask fitted with a mechanical stirrer, a pH electrode, and an addition funnel. The mixture is agitated to form a homogeneous slurry. The pH of the slurry is adjusted to 9.5 with 10% aqueous sodium hydroxide solution. Then a freshly prepared solution of sodium aluminate (108.6 gm) in distilled water (2.0 liters) is added. The slurry is stirred 10 hours at room temperature (about 20° C.). Then stirring is stopped and the mixture is allowed to stand overnight. The resulting product is transferred to a reaction vessel, and a solution of silver nitrate (156 gms) in distilled water is added. This mixture is stirred for 10–20 minutes and left standing overnight at room temperature. The exchange liquor is then removed by suction filtration and the solid is washed until wash effluent contains no detectable silver ion. Dewatering and drying is carried out by filtering to remove bulk water and drying in a forced-draft oven (105°–110° C.) overnight.

The solvent consists by volume of 100% ethyl acetate ($\delta=8.85$, $\delta_D=7.70$, $\delta_P=2.60$, and $\delta_H=3.50$).

The controller and the valves of the demonstration unit are set so that the adsorption zone includes eight columns, the purification zone includes eight columns, the desorption zone includes 6 columns and the buffer zone includes two columns (total columns=24).

The step time (the interval at which the flow pattern is advanced one column) is 7 minutes.

The feed rate is 1.75 ml. per minute. The solvent introduction rate is 47.00 ml. per minute. The extract flow rate is 18.75 ml. per minute. The raffinate flow rate is 17.00 ml. per minute. The solvent outlet flow rate (at the exit of the buffer zone) is 13.00 ml. per minute.

The temperature of operation is 40° C.

Raffinate, extract, and solvent outlet streams are recovered. Separation is obtained on the basis of Iodine Value.

Triglyceride fraction in the extract contains by weight (on a methyl ester basis) 3.69% methyl palmitate, 0.80% methyl stearate, 14.28% methyl oleate, 63.53% methyl linoleate, and 17.70% methyl linolenate.

Triglyceride fraction in the raffinate contains by weight (on a methyl ester basis) 12.29% methyl palmitate, 5.24% methyl stearate, 28.30% methyl oleate, 51.70% methyl linoleate, and 2.47% methyl linolenate and has an Iodine Value of about 125. The product is suitable for use as a liquid shortening or as a salad or cooking oil. The product contains no trans double bonds and no double bonds in positions different from those in the feedstock. The triglyceride in the raffinate consists of about 75% of that in the feedstock.

Processing is carried out without any significant amount of polymerization.

There is no significant leaching of silver. There is no fouling of the adsorbent with impurities.

The adsorbent particle size does not result in any significant handling or loss problems.

When Zeolite X or Zeolite Y or silvered Zeolite X or silvered Zeolite Y is substituted for the adsorbent in the run of Example II, essentially no fractionation on the basis of Iodine Value is obtained. This is due at least in part to inferior dynamic capacity.

EXAMPLE III

This example illustrates separation of triglycerides into extract fraction containing a substantially reduced percentage of triglyceride with saturated fatty acid moiety and a raffinate fraction. The run is carried out utilizing continuous simulated moving bed processing.

The feed composition is refined, bleached and deodorized sunflower oil. It contains by weight (on a methyl ester basis) 6.61% methyl palmitate, 3.73% methyl stearate, 23.96% methyl oleate and 65.70% methyl linoleate. It is essentially free of impurities which can foul the adsorbent.

The adsorbent is the same as that used in Example II.

The solvent consists by volume of 100% ethyl acetate ($\delta=8.85$, $\delta_D=7.70$, $\delta_P=2.60$, $\delta_H=3.50$).

The controller and the valves of the demonstration unit are set so that the adsorption zone includes three columns, the purification zone includes eight columns, the desorption zone includes three columns and the buffer zone includes one column (total columns=12).

The step time (the interval at which the flow pattern is advanced one column) is 7.00 minutes.

The feed rate is 2.0 ml. per minute. The solvent introduction rate is 41.50 ml. per minute. The extract flow rate is 13.25 ml. per minute. The raffinate flow rate is 17.00 ml. per minute. The solvent outlet flow rate (at the exit of the buffer zone) is 13.25 ml. per minute.

The temperature of operation is 50° C.

Separation is obtained on the basis of Iodine Value, i.e., to obtain fractions of higher Iodine Value and of lower Iodine Value.

Triglyceride fraction in the raffinate contains by weight (on a methyl ester basis) 8.65% methyl palmitate, 4.75% methyl stearate, 28.45% methyl oleate and 58.15% methyl linoleate.

Triglyceride fraction in the extract contains by weight (on a methyl ester basis) 2.20% methyl palmitate, 0.84% methyl stearate, 14.28% methyl oleate, and 82.58% methyl linoleate. It is suitable for use as a salad or cooking oil.

Processing is carried out without any significant amount of polymerization.

There is no significant leaching of silver. There is no fouling of the adsorbent with impurities.

The adsorbent particle size does not result in any significant handling or loss problems.

When in the run of Example III, the adsorbent is derived from Grade 59 Silica Gel (mean pore diameter of approximately 75 angstroms and a surface area of 470 square meters per gram) instead of Silica Gel 100, extract triglyceride fraction is obtained containing less than 3.5% by weight saturated fatty acid moiety (on a fatty methyl ester basis).

When in the run of Example III, an equivalent amount of copper or platinum or palladium is substituted for the silver substituents of the adsorbent, results are obtained indicating attainment of fractionation on the basis of Iodine Value.

When in the run of Example III, an equivalent amount of potassium, barium, calcium, magnesium or zinc substituents is substituted for the sodium substituents of the adsorbent, results are obtained indicating fractionation on the basis of Iodine Value.

When Amberlyst XN1010 (a macroreticular strong acid cation exchange resin sold by Rohm & Haas) with an equivalent amount of silver to that used in Example III is substituted for the adsorbent in the run of Example III, the fractionation obtained is significantly less complete (the extract triglyceride fraction contains more than 3.5% by weight saturated fatty acid moiety on a fatty methyl ester basis).

When Zeolite X or Zeolite Y or silvered Zeolite X or silvered Zeolite Y is substituted for the adsorbent in the run of Example III, essentially no fractionation on the basis of Iodine Value is obtained. This is due at least in part to inferior dynamic capacity.

EXAMPLE IV

This example illustrates separation of triglycerides into extract fraction containing a substantially reduced percentage of triglyceride with saturated fatty acid moiety and a raffinate fraction. The run is carried out utilizing continuous simulated moving bed processing.

The feed composition is refined, bleached and deodorized sunflower oil. It contains by weight (on a methyl ester basis) 6.37% methyl palmitate, 4.45% methyl stearate, 17.26% methyl oleate and 71.92% methyl linoleate. It is essentially free of impurities which can foul the adsorbent.

The adsorbent has the following characteristics: It is derived from silica gel having a mean pore diameter of approximately 100 angstroms and a surface area of 346 square meters per gram. It is also characterized by a ratio of surface-silicon atoms to aluminum atoms of 11.4:1, a moisture content less than 2% by weight, and a particle size of 35–50 mesh (U.S. Sieve Series). It contains 0.13 millimoles of silver (in the form of cation substituents in a valence state of 1) per 100 square meters of adsorbent surface area. The silver substituents make up 78.3% of the exchangeable cations. The remainder of the exchangeable cations are sodium substituents. The surface area of the final adsorbent is 245 square meters per gram.

The adsorbent is made as follows: Silica Gel 100 is screened to provide a fraction of 35–50 mesh particle size. 1000 grams of such fraction and 2 liters of distilled water are charged into a 5.0 liter, 3-neck, fluted flask fitted with a mechanical stirrer, a pH electrode, and an addition funnel. The mixture is agitated to form a homogeneous slurry. The pH of the slurry is adjusted to 9.5 with 10% aqueous sodium hydroxide solution. Then a freshly prepared solution of sodium aluminate (43.4 gm) in distilled water (2.0 liters) is added. The slurry is stirred 10 hours at room temperature (about 20° C.). Then stirring is stopped and the mixture is allowed to stand overnight. The resulting product is transferred to a reaction vessel, and a solution of silver nitrate (82.8 gms) in distilled water is added. This mixture is stirred for 10–20 minutes and left standing overnight at room temperature. The exchange liquor is then removed by suction filtration and the solid is washed until wash effluent contains no detectable silver ion. Dewatering and drying is carried out by filtering to remove bulk water and drying in a forced-draft oven (105°–110° C.) overnight.

The solvent consists by volume of 60% hexane and 40% ethyl acetate. For this solvent blend: $\delta=7.65$, $\delta_D=7.46$, $\delta_P=1.04$, $\delta_H=1.4$.

The controller and the valves of the demonstration unit are set so that the adsorption zone includes eight columns, the purification zone includes eight columns, the desorption zone includes 6 columns and the buffer zone includes two columns (total columns=24).

The step time (the interval at which the flow pattern is advanced one column) is 6 minutes.

The feed rate is 1.00 ml. per minute. The solvent introduction rate is 51.50 ml. per minute. The extract flow rate is 12.70 ml. per minute. The raffinate flow rate is 20.30 ml. per minute. The solvent outflow flow rate (at the exit of the buffer zone) is 19.50 ml. per minute.

The temperature of operation is 50° C.

Raffinate, extract, and solvent outlet streams are recovered. Separation is obtained on the basis of Iodine Value, i.e., to obtain fractions of higher Iodine Value and of lower Iodine Value.

Triglyceride fraction in the raffinate contains by weight (on a methyl ester basis) 8.40% methyl palmitate, 6.31% methyl stearate, 21.53% methyl oleate and 63.76% methyl linoleate.

Triglyceride fraction in the extract contains by weight (on a methyl ester basis) 0.55% methyl palmitate, 0.32% methyl stearate, 7.42% methyl oleate, and 91.71% methyl linoleate. It is suitable for use as a salad or cooking oil.

Processing is carried out without any significant amount of polymerization.

There is no significant leaching of silver. There is no fouling of the adsorbent with impurities.

The adsorbent particle size does not result in any significant handling or loss problems.

When a solvent consisting by volume of 70% hexane and 30% acetone (for this solvent blend: $\delta=7.62$, $\delta_D=7.39$, $\delta_P=1.53$, $\delta_H=1.02$) is substituted in Example IV for the hexane/ethyl acetate solvent, fractionation on the basis of Iodine Value is obtained.

When a solvent consisting by volume of 100% diethyl ether ($\delta=7.65$, $\delta_D=7.1$, $\delta_P=1.4$, $\delta_H=2.5$) is substituted in Example IV for the hexane/ethyl acetate solvent, fractionation on the basis of Iodine Value is obtained.

When a solvent consisting by volume of 17.5% ethanol and 82.5% hexane (for this solvent blend: $\delta=7.70$, $\delta_D=7.48$, $\delta_P=6.75$, $\delta_H=1.66$) is substituted in Example IV for the hexane/ethyl acetate solvent, fractionation on the basis of Iodine Value is attained.

When Amberlyst XN1010 (a macroreticular strong acid cation exchange resin sold by Rohm & Haas) with an equivalent amount of silver to that used in Example IV is substituted for the adsorbent in the run of Example IV, the fractionation obtained is significantly less complete (the extract triglyceride fraction contains more than 3.5% by weight saturated fatty acid moiety on a fatty methyl ester basis).

When Zeolite X or Zeolite Y or silvered Zeolite X or silvered Zeolite Y is substituted for the adsorbent in the run of Example IV, assentially no fractionation on the basis of Iodine Value is obtained. This is due at least in part to inferior dynamic capacity.

EXAMPLE V

This example illustrates separation of triglycerides into extract fraction containing a substantially reduced percentage of triglyceride with saturated fatty acid moiety and a raffinate fraction. The run is carried out utilizing continuous simulated moving bed processing.

The feed composition contains by weight (on a methyl ester basis) 5.66% methyl palmitate plus methyl stearate, 14.00% methyl oleate and 80.34% methyl linoleate. It is essentially free of impurities which can foul the adsorbent.

The adsorbent has the following characteristics: It is derived from silica gel having a mean pore diameter of approximately 100 angstroms and surface area of 346 square meters per gram. It is also characterized by a ratio of surface-silicon atoms to aluminum atoms of 10.7:1, a moisture content less than 2% by weight, and a particle size of 35–50 mesh (U.S. Sieve Series). It contains 0.19 millimoles of silver It contains 0.19 millimoles of silver (in the form of cation substituents in a valence state of 1) per 100 square meters of adsorbent surface area. The silver substituents make up 89.2% of the exchangeable cations. The remainder of the exchangeable cations are sodium substituents. The surface area of the final adsorbent is 277 square meters per gram.

The adsorbent is made up the same as the adsorbent of Example IV except that 58 gms of sodium aluminate is used in the surface alumination reaction and 148 gms of silver nitrate is used in the silvering procedure.

The solvent consists by volume of 100% ethyl acetate ($\delta=8.85$, $\delta_D=7.70$, $\delta_P=2.60$, and $\delta_H=3.50$).

The controller and the valves of the demonstration unit are set so that the adsorption zone includes three columns, the purification zone includes six columns, and the desorption zone includes three columns (total columns=12).

The step time (the interval at which the flow pattern is advanced one column) is 6.90 minutes.

The feed rate is 1.50 ml. per minute. The solvent introduction rate is 50.30 ml. per minute. The extract flow rate is 21.80 ml. per minute. The raffinate flow rate is 30.00 ml. per minute.

The temperature of operation is 50° C.

Raffinate and extract streams are recovered. Separation is obtained on the basis of Iodine Value, i.e., to obtain fractions of higher Iodine Value and of lower Iodine Value.

Triglyceride fraction in the raffinate contains by weight (on a methyl ester basis) 13.54% methyl palmitate plus methyl stearate, 17.03% methyl oleate and 69.43% methyl linoleate).

Triglyceride fraction in the extract contains by weight (on a methyl ester basis) 1.41% methyl palmitate plus methyl stearate, 12.25% methyl oleate, and 86.34% methyl linoleate. It is suitable for use as a salad or cooking oil.

Processing is carried out without any significant amount of polymerization.

There is no significant leaching of silver. There is no fouling of the adsorbent with impurities.

The adsorbent particle size does not result in any significant handling or loss problems.

When Amberlyst XN1010 (a macroreticular strong acid cation exchange resin sold by Rohm & Haas) with an equivalent amount of silver to that used in Example V is substituted for the adsorbent in Example V, separation is significantly less complete.

When Zeolite X or Zeolite Y or silvered Zeolite X or silvered Zeolite Y is substituted for the adsorbent in the run of Example V, essentially no fractionation on the basis of Iodine Value is obtained. This is due at least in part to inferior dynamic capacity.

EXAMPLE VI

This example illustrates separation of triglycerides into two extract fractions each containing a substantially reduced percentage of triglyceride with saturated fatty acid moiety and a raffinate fraction. The run is carried out utilizing continuous simulated moving bed processing with two successive desorption zones.

The feed composition is refined, bleached and deodorized sunflower oil. It contains by weight (on a methyl ester basis) 10.33% methyl palmitate plus methyl stearate, 23.96% methyl oleate, and 65.71% methyl linoleate. It is essentially free of impurities which can foul the adsorbent.

The adsorbent is the same as that used in Example II.

The solvent for each of the two solvent inlet streams is the same and consists by volume of 100% ethyl acetate ($\delta=8.85$, $\delta_D=7.70$, $\delta_P=2.60$, and $\delta_H=3.50$).

The controller and the valves of the demonstration unit are set so that the adsorption zone includes 2 columns, the buffer zone includes 1 column, the first desorption zone includes 3 columns, the second desorption zone includes 1 column and the purification zone includes 5 columns (total columns=12).

The step time (the interval at which the flow pattern is advanced one column) is 6.9 minutes.

The temperature of operation is 50° C. except that the solvent inlet stream into the upstream end of the first desorption zone is at 70° C.

The feed rate is 2.00 ml per minute. The solvent introduction rate into the first desorption zone is 45.00 ml per minute. The solvent introduction rate into the second desorption zone is 33.25 ml per minute. The first extract flow rate is 45.00 ml per minute. The second extract flow rate is 5.00 ml per minute. The raffinate flow rate is 17.00 ml per minute. The solvent outlet flow rate (at the downstream end of the buffer zone) is 13.25 ml per minute.

Raffinate, first extract, second extract and solvent outlet streams are recovered. Separation is obtained on the basis of Iodine Value, i.e., to obtain fractions of higher Iodine Value and of lower Iodine Value.

Triglyceride fraction in the first extract contains by weight (on a methyl ester basis) 1.95% methyl palmitate plus methyl stearate, 7.65% methyl oleate and 90.40% methyl linoleate. It is suitable for use as a salad or cooking oil.

Triglyceride fraction in the second extract contains by weight (on a methyl ester basis) 4.65% methyl palmitate plus methyl stearate, 16.95% methyl oleate and 78.40% methyl linoleate. It is suitable for use as a salad or cooking oil and contains a reduced percentage of saturates compared to the feed and an increased percentage of polyunsaturated moiety compared to the feed but a lesser percentage of polyunsaturated moiety than if a single desorption zone were used.

Triglyceride fraction in the raffinate contains by weight (on a methyl ester basis) 11.0% methyl palmitate plus methyl stearate, 23.50% methyl oleate and 65.50% methyl linoleate.

Triglyceride fraction in the solvent outlet stream contains by weight (on a methyl ester basis) 3.35% methyl palmitate plus methyl stearate, 10.73% methyl oleate, and 85.92% methyl linoleate.

Processing is carried out without any significant amount of polymerization.

There is no significant leaching of silver. There is no fouling of the adsorbent with impurities.

The adsorbent particle size does not result in any significant handling or loss problems.

The use of two desorption zones instead of one allows better control of the relative amounts of saturated moiety and polyunsaturated moiety in product obtained from an extract stream.

When Zeolite X or Zeolite Y or silvered Zeolite X or silvered Zeolite Y is substituted for the adsorbent in the run of Example VI, essentially no fractionation on the basis or Iodine Value is obtained. This is due at least in part to inferior dynamic capacity.

EXAMPLE VII

The triglyceride mixture for fractionation contains by weight 15.78% trisaturated triglyceride (containing palmitic acid and stearic acid moieties), 42.11% triolein, and 42.11% trilinolein.

The adsorbent used has the following characteristics: It is derived from silica gel having a mean pore diameter of approximately 75 angstroms and a surface area of 470 square meters per gram. It is also characterized by a ratio of surface-silicon atoms to aluminum atoms of 4.97:1, a moisture content less than 2% by weight, and a particle size of 35–70 mesh (U.S. Sieve Series). It contains 0.33 millimoles of silver (in the form of cation substituents in a valence state of 1) per 100 square meters of adsorbent surface area. The silver substituents make up 97.6% of the exchangeable cations. The remainder of the exchangeable cations are sodium substituents. The surface area of the final adsorbent is 366 square meters per gram.

Such adsorbent is made as follows: Grade 59 Silica Gel (3–8 mesh U.S. Sieve Series) is gently crushed, and a fraction with particle size range of 35–70 mesh is recovered. 1000 grams of such fraction and 2 liters of distilled water are charged into a 5.0 liter, 3-neck, fluted flask fitted with a mechanical stirrer, a pH electrode, and an addition funnel. The mixture is agitated to form a homogeneous slurry. The pH of the solution is adjusted to 9.5 with 10% aqueous sodium hydroxide solution. Then a freshly prepared solution of sodium aluminate (112.2 gm) in distilled water (2.0 liters) is added. The slurry is stirred 10 hours at room temperature (about 20° C.). Then stirring is stopped and the mixture is allowed to stand overnight. The resulting product is poured into a glass chromatographic column and washed free of unreacted aluminate with distilled water (1-2 ml. per minute). Then, the material in the column is treated with a solution of silver nitrate (a two-fold molar equivalent of silver based on the aluminate reagent) in distilled water. Flow rate of the silver exchange solution is about 0.5 ml./minute. The solid is then washed with distilled water to remove excess silver nitrate, suction filtered to remove bulk water, and dried in a forced-draft oven (105°-110° C.) overnight.

The solvent used first consists by volume of 100% hexane ($\delta=7.30$, $\delta_D=7{:}30$, $\delta_p=0$, $\delta_H=0$); this solvent is denoted Solvent I below. The solvent used second consists by volume of 90% hexane and 10% ethyl acetate (for this solvent blend: $\delta=7.35$, $\delta_D=7{:}34$, $\delta_p=0.25$, and $\delta_H=0.35$ ); this solvent is denoted Solvent II below. The solvent used third consists by volume of 50% hexane and 50% ethyl acetate (for this solvent blend: $\delta=7.81$, $\delta_D=7.50$, $\delta_P=1.30$, $\delta_H=1.75$); this solvent is denoted Solvent III below. The solvent used fourth consists by volume of 100% ethyl acetate ($\delta=8.85$, $\delta=7.70$, $\delta_P=2.60$, $\delta_H=3.50$); this solvent is denoted Solvent IV below. The solvent used fifth consists by volume of 100% methanol ($\delta=14.5$, $\delta_D=7.4$, $\delta_D=6.0$, $\delta_H=10.9$); this solvent is denoted Solvent V below.

The test is carried out at 50° C.

Solvent I is pumped through the "pulse test" column described above at 5.0 ml./minute. With flow stopped, a "pulse" containing 2.0 grams (95% triglyceride mixture described above and 5% $C_{22}$ linear hydrocarbon tracer) dissolved in 10 ml. of Solvent I is injected into the column entrance. Flow of Solvent I is then restarted, and eluant sample collection begins. After approximately two column volumes of Solvent I are pumped, the solvent is changed to Solvent II, then to Solvent III, etc. with approximately two column volumes of each solvent being pumped in succession after the above described feed injection. Fluant samples are collected. Triglyceride mixture in each collected sample is converted to methyl ester which is analyzed by gas chromatography.

The table below presents the data for this run. In the table: "$S_3$" stands for trisaturated triglyceride, "$M_3$" stands for triolein, and "$D_3$" stands for trilinolein. The values given opposite each solvent represent the triglyceride composition eluted with that particular solvent. "IV" in the table below stands for the calculated Iodine Value of an eluted composition.

TABLE

SEPARATION OF TRIGLYCERIDE MIXTURE IN A TWO SOLVENT PROCESS

| Solvent | % $S_3$ | % $M_3$ | % $D_3$ | IV |
|---|---|---|---|---|
| I | — | — | — | — |
| II | 30.77 | 56.56 | 12.67 | 85.62 |
| III | 4.13 | 34.13 | 61.74 | 199.88 |
| IV | 0.98 | 11.97 | 87.05 | 249.29 |
| V | 0.40 | 8.68 | 90.92 | 257.83 |

The above data indicates that with the selected adsorbent, to provide one fraction enriched in saturates ($S_3$) and second fraction enriched in unsaturates ($M_3$and $D_3$), the solvent constituting the adsorption vehicle would contain between 90 and 100% hexane with the remainder being ethyl acetate and the solvent constituting the desorbent would be 100% ethyl acetate. Another way of obtaining fraction enriched in saturates would be to use 100% hexane as the adsorbing solvent and desorbent consisting by volume of 95% hexane and 5% ethyl acetate.

In the test of Example VII, separation on the basis of Iodine Value is obtained, i.e., to produce fractions of higher Iodine Value and of lower Iodine Value.

Processing is carried out without any significant amount of polymerization.

There is no significant leaching of silver. There is no fouling of the adsorbent with impurities.

The adsorbent particle size does not result in any significant handling or loss problems.

Other solvents and blends can be substituted in the above example to provide similar results provided there is similarity of solubility parameter and solubility parameter components.

While the foregoing describes certain preferred embodiments of the invention, modifications will be readily apparent to those skilled in the art. Thus, the scope of the invention is intended to be defined by the following claims.

What is claimed is:

1. A process for separating a mixture of triglycerides with different Iodine Values and having their carboxylic acid moieties containing from 6 to 26 carbon atoms, to produce fractions of higher Iodine Value and lower Iodine Value, said process comprising the steps of (a) contacting a solution of said mixture in solvent with surface aluminated silica gel adsorbent to selectively adsorb triglyceride of higher Iodine Value and to leave in solution a fraction of said mixture enriched in content of triglyceride of lower Iodine Value, (b) removing solution of fraction enriched in content of triglyceride of lower Iodine Value from contact with adsorbent which has selectively adsorbed triglyceride of higher Iodine Value, (c) contacting adsorbent which has selectively adsorbed triglyceride of higher Iodine Value with solvent to cause desorption of adsorbed triglyceride and provide a solution in solvent of fraction enriched in content of triglyceride of higher Iodine Value, (d) removing solution of fraction enriched in content of triglyceride of higher Iodine Value from contact with adsorbent;

said mixture of triglycerides being essentially free of impurities which can foul the adsorbent; the solvent in step (a) and the solvent in step (c) having the same composition or different compositions and being characterized by a solubility parameter (on a 25° C. basis) ranging from about 7.0 to about 15.0, a solubility parameter dispersion component (on a 25° C. basis) ranging from about 7.0 to about 9.0, a solubility parameter polar component (on a 25° C. basis) ranging from about 0 to about 6.0 and a solubility parameter hydrogen bonding component (on a 25° C. basis) ranging from 0 to about 11.5; said adsorbent being derived from silica gel having a mean pore diameter of at least about 75 angstroms and a surface area of at least about 100 square meters per gram; said absorbent being further characterized by a ratio of surface-silicon atoms to aluminum atoms ranging from about 3:1 to about 20:1, a moisture content less than about 10% by weight, and a particle size ranging from about 200 mesh to about 20 mesh; said adsorbent having cation substituents selected from the group consisting of cation substituents capable of forming $\pi$ complexes and cation substituents not capable of forming $\pi$ complexes and combinations of these; the solvent in step (a) and the solvent in step (c) and the ratio of surface-silicon atoms to aluminum atoms in the adsorbent and the level of cation substituents capable of forming $\pi$ complexes being selected to provide selectivity in step (a) and desorption in step (c).

2. A process as recited in claim 1 in which the cation substituents capable of forming $\pi$ complexes are selected from the group consisting of silver, copper, platinum and palladium cation substituents and combinations of these, and in which the cation substituents not capable of forming $\pi$ complexes are selected from the group consisting of cation substituents from Group IA of the Periodic Table, cation substituents from Group IIA of the Periodic Table, zinc cation substituents and combinations of these.

3. A process as recited in claim 2, in which the adsorbent has cation substituents selected from the group consisting of silver substituents in a valence state of one and sodium substituents and combinations of these.

4. A process as recited in claim 3, in which the adsorbent is characterized by a level of silver substituents greater than about 0.05 millimoles/100 square meters of adsorbent surface area.

5. A process as recited in claim 4, in which the solvent in each step has the same composition and is characterized by a solubility parameter (on a 25° C. basis) ranging from about 7.0 to about 10.5, a solubility parameter dispersion component (on a 25° C. basis) ranging from about 7.0 to about 9.0, a solubility parameter polar component (on a 25° C. basis) ranging from about 0.2 to about 5.1, and a solubility parameter hydrogen bonding component (on a 25° C. basis) ranging from about 0.3 to about 7.4.

6. A process as recited in claim 5, in which the solvent is characterized by a solubility parameter (on a 25° C. basis) ranging from about 7.4 to about 9.0, a solubility parameter dispersion component (on a 25° C. basis) ranging from about 7.25 to about 8.0, a solubility parameter polar component (on a 25° C. basis) ranging from about 0.5 to about 3.0 and a solubility parameter hydrogen bonding component (on a 25° C. basis) ranging from about 0.7 to about 4.0.

7. A process as recited in claim 5 in which said solvent comprises ethyl acetate.

8. A process as recited in claim 5, in which said adsorbent is derived from silica gel having a surface area of at least about 300 square meters per gram and is further characterized by a ratio of surface-silicon atoms to aluminum atoms ranging from about 3:1 to about 12:1, a silver level ranging from about 0.10 millimoles/100 square meters of adsorbent surface area to about 0.35 millimoles/100 square meters of adsorbent surface area, and a moisture content less than about 4% by weight.

9. A process as recited in claim 8, which is carried out by a continuous simulated moving bed technique.

10. A process as recited in claim 9, in which the mixture of triglycerides being separated is refined and bleached sunflower oil and in which fraction obtained in step (d) contains less than about 3.5% by weight saturated fatty acid moiety (on a fatty methyl ester basis).

11. A process as recited in claim 10 in which the simulated moving bed technique involves use of a plurality of successive desorption zones.

12. A process as recited in claim 9, in which the mixture of triglycerides which is separated is refined, bleached and deodorized soybean oil containing from about 6.5% to about 8.5% by weight linolenic acid moiety (on a fatty methyl ester basis) and having an Iodine Value ranging from about 130 to about 150 and in which the fraction obtained in step (b) contains from 0% to about 5% by weight linolenic acid moiety (on a fatty methyl ester basis) and has an Iodine Value ranging from about 80 to about 125.

13. A process as recited in claim 4, in which the solvent in step (a), the adsorption vehicle, has a different composition from the solvent in step (c), the desorbent.

14. A process as recited in claim 13, in which the adsorption vehicle is characterized by a solubility parameter (on a 25° C. basis) ranging from about 7.3 to about 14.9, a solubility parameter dispersion component (on a 25° C. basis) ranging from about 7.3 to about 9.0, a solubility parameter polar component (on a 25° C. basis) ranging from 0 to about 5.7, and a solubility parameter hydrogen bonding component (on a 25° C. basis) ranging from 0 to about 11.0; in which the desorbent is characterized by a solubility parameter (on a 25° C. basis) ranging from about 7.4 to about 15.0 and at least 0.1 greater than that of the adsorption vehicle, a solubility parameter dispersion component (on a 25° C. basis) ranging from about 7.3 to about 9.0, a solubility parameter polar component (on a 25° C. basis) ranging from about 0.3 to about 6.0 and at least 0.3 greater than that of the adsorption vehicle, and a solubility parameter hydrogen bonding component (on a 25° C. basis) ranging from about 0.5 to about 11.5 and at least 0.5 greater than that of the absorption vehicle.

15. A process as recited in claim 14, in which the adsorption vehicle is characterized by a solubility parameter (on a 25° C. basis) ranging from about 7.3 to about 9.0, a solubility parameter dispersion component (on a 25° C. basis) ranging from about 7.3 to about 8.0, a solubility parameter polar component (on a 25° C. basis) ranging from 0 to about 2.7, and a solubility parameter hydrogen bonding component (on a 25° C. basis) ranging from 0 to about 3.6 and in which the desorbent is characterized by a solubility parameter (on a 25° C. basis) ranging from about 7.4 to about 10.0, a solubility parameter dispersion component (on a 25° C. basis) ranging from about 7.3 to about 8.0, a solubility parameter polar component (on a 25° C. basis) ranging from about 0.5 to about 4.0 and a solubility parameter hydrogen bonding component (on a 25° C. basis) ranging from about 0.5 to about 6.0.

16. A process as recited in claim 15, in which the adsorption vehicle comprises hexane and in which the desorbent comprises ethyl acetate.

17. A process as recited in claim 14, in which said adsorbent is derived from silica gel having a surface area of at least about 300 square meters per gram and is further characterized by a ratio of surface-silicon atoms to aluminum atoms ranging from about 3:1 to about 12:1, a silver level ranging from about 0.10 millimoles/100 square meters of adsorbent surface area to about 0.35 millimoles/100 square meters of adsorbent surface area, and a moisture content less that about 4% by weight.

* * * * *

UNITED STATES PATENT AND TRADEMARK OFFICE

CERTIFICATE OF CORRECTION

PATENT NO. : 4,284,580

DATED : August 18, 1981

INVENTOR(S) : Ted J. Logan and Richard M. King

It is certified that error appears in the above-identified patent and that said Letters Patent are hereby corrected as shown below:

Column 2, line 23, after "." and before "Lam" should start a new paragraph.

Column 3, line 29, "in" should read "an".

Column 15, line 9, after "utilizing" and before "(a)" insert --- a column containing adsorbent and alternately ---.

Column 17, line 9, after "C." insert --- to about 80°C. ---.

Column 26, lines 34-35, after "Series)." and before "It" delete the first occurrence of --- It contains 0.19 millimoles of silver ---.

Column 29, line 36, "Fluant" should read "Eluant".

Signed and Sealed this

*Thirtieth* Day of *March 1982*

[SEAL]

*Attest:*

GERALD J. MOSSINGHOFF

*Attesting Officer* *Commissioner of Patents and Trademarks*